United States Patent
Chien et al.

(10) Patent No.: US 8,519,967 B2
(45) Date of Patent: Aug. 27, 2013

(54) COLOR FILTER TOUCH SENSING SUBSTRATE AND DISPLAY PANEL AND MANUFACTURING METHODS OF THE SAME

(75) Inventors: Yu-Feng Chien, Taipei County (TW); Tun-Chun Yang, Taipei (TW); Seok-Lyul Lee, Hsinchu (TW); Wei-Ming Huang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 920 days.

(21) Appl. No.: 12/471,491

(22) Filed: May 26, 2009

(65) Prior Publication Data

US 2010/0149117 A1    Jun. 17, 2010

(30) Foreign Application Priority Data

Dec. 11, 2008    (TW) ................................ 97148273 A

(51) Int. Cl.
*G06F 3/041* (2006.01)
(52) U.S. Cl.
USPC ........................................ 345/173; 178/18.06
(58) Field of Classification Search
USPC ................ 178/18.06, 18.01–20.04; 345/104, 345/173–184; 349/12, 106
See application file for complete search history.

(56) References Cited

U.S. PATENT DOCUMENTS

| | | | |
|---|---|---|---|
| 5,867,151 A * | 2/1999 | Nakai | 345/173 |
| 6,057,903 A | 5/2000 | Colgan et al. | |
| 6,067,144 A | 5/2000 | Murouchi | |
| 6,501,529 B1 | 12/2002 | Kurihara et al. | |
| 7,253,846 B2 * | 8/2007 | Song et al. | 349/12 |
| 8,134,540 B2 * | 3/2012 | Kuo et al. | 345/174 |
| 2002/0171801 A1 | 11/2002 | Hsieh et al. | |
| 2007/0085804 A1 * | 4/2007 | Tajiri | 345/98 |
| 2007/0138513 A1 * | 6/2007 | Sato et al. | 257/239 |
| 2009/0309850 A1 * | 12/2009 | Yang | 345/174 |

FOREIGN PATENT DOCUMENTS

| | | |
|---|---|---|
| CN | 101131492 | 2/2008 |
| CN | 101320107 | 12/2008 |

* cited by examiner

*Primary Examiner* — Amr Awad
*Assistant Examiner* — Aaron Midkiff
(74) *Attorney, Agent, or Firm* — Jianq Chyun IP Office

(57) ABSTRACT

A manufacturing method of a color filter touch sensing substrate is provided. Firstly, a first film is formed on a substrate. The first film includes a plurality of first and second touch sensors and a plurality of first bridge lines for electrically connecting the first touch sensors in the same column. Then, a second film is formed on the substrate. The second film includes a plurality of second bridge lines for electrically connecting the second touch sensors in the same row. Next, a light shielding pattern layer is formed between the first and the second films. The light shielding pattern layer is used to define a plurality of sub-pixel regions on the substrate. Afterward, a plurality of color filter pattern layers is formed in the sub-pixel regions. Furthermore, a color filter touch sensing substrate, a display panel and manufacturing methods thereof are also provided.

19 Claims, 18 Drawing Sheets

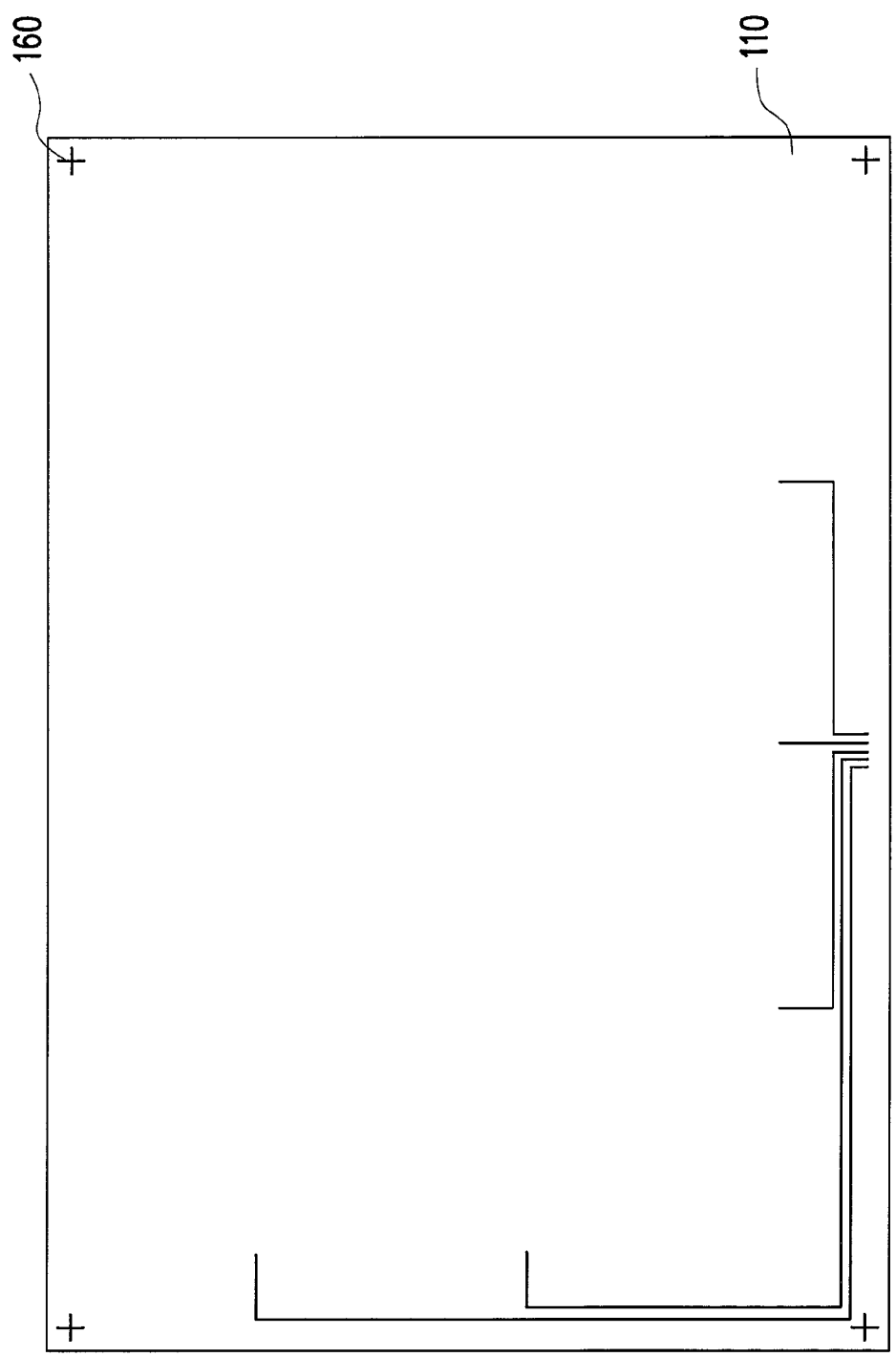

COLOR FILTER TOUCH SENSING SUBSTRATE AND DISPLAY PANEL AND MANUFACTURING METHODS OF THE SAME

CROSS-REFERENCE TO RELATED APPLICATION

This application claims the priority benefit of Taiwan application serial no. 97148273, filed Dec. 11, 2008. The entirety of the above-mentioned patent application is hereby incorporated by reference herein and made a part of specification.

BACKGROUND OF THE INVENTION

1. Field of the Invention

The present invention relates to a color filter touch sensing substrate, a display panel and manufacturing methods of the same. More particularly, the present invention relates to a color filter touch sensing substrate using a light shielding pattern layer to separate bridge lines of adjacent touch sensors, a display panel, and manufacturing methods of the same.

2. Description of Related Art

Touch sensing panels can be categorized into resistance touch sensing panels, capacitance touch sensing panels, optical touch sensing panels, sound wave touch sensing panels, and electromagnetic touch sensing panels, etc, based on differences in the sensing principles. The capacitance touch sensing panels are now widely used as they have fast response time, high sensitivity, high reliability, and long durability.

The capacitance touch sensing panels can be classified as plug in or built in (integrative) according to assembly methods. The plug in capacitance touch sensing panels usually start with manufacturing a sensor on a touch sensing substrate, and attach the manufactured touch sensing substrate, which includes the sensor electrode, on an outer surface of a plat panel display (FPD), such as a liquid crystal display (LCD). Obviously, the touch sensing substrate in the plug in touch sensing panel increases an overall thickness and adversely affects the slimness and lightness of the LCD.

Moreover, the built in capacitance touch sensing panels can be classified based on their designs, which include manufacturing the touch sensor on a back surface of the color filter substrate and integrating the touch sensor into the structure of the color filter substrate to form the so-called color filter touch sensing substrate. The method of manufacturing the touch sensor on the back surface of the color filter substrate has a simple touch sensor design and a simple manufacturing process. However, this method has a difficulty in material development as a material with high hardness and stability is required to avoid scratches and increase manufacturing efficiency. In addition, a failure to slim a color filter glass substrate is another problem. Moreover, the conventional method of integrating the touch sensor into the color filter substrate structure is mainly using a black matrix formed by Chromium (Cr) as the touch sensor. However, using the Chromium black matrix as the touch sensor would cause a touch area of the touch sensor to be far smaller than that of the former and result in great reduction in touch signals. Furthermore, an extra light shielding layer is usually required on a border of the touch sensor, and consequently increases the complexity and difficulty of the manufacturing process.

SUMMARY OF THE INVENTION

The present invention provides a color filter touch sensing substrate and a manufacturing method thereof The present invention can solve a problem in integrating a touch sensor into the color filter substrate structure which has a small touch sensing area and results in reduction of touch signals.

A display panel and a manufacturing method thereof are provided in the present invention. Moreover, the display panel includes the aforementioned color filter touch sensing substrate.

The present invention provides a manufacturing method of a color filter touch sensing substrate which includes the following steps. Firstly, a first film is formed on a substrate. A first film includes a plurality of first touch sensors, a plurality of second touch sensors, and a plurality of first bridge lines used to electrically connect the first touch sensors in the same column. Then, a second film is formed on the substrate. The second film includes a plurality of second bridge lines used to electrically connect the second touch sensors in the same row. Afterward, a light shielding pattern layer is formed between the first film and the second film. The light shielding pattern layer is used to define a plurality of sub-pixel regions on the substrate. Here, a portion of the light shielding pattern layer is disposed at junctions between the second bridge lines and the first bridge lines. Next, a plurality of color filter pattern layers is formed in the sub-pixel regions.

In one embodiment of the present invention, a method of forming a first film, a second film, and a light shielding pattern layer includes the following steps. Firstly, the first touch sensors, the second touch sensors, and the first bridge lines used to electrically connect the first touch sensors in the same column are formed on the substrate. Then, the light shielding pattern layer is formed. Moreover, a portion of the light shielding pattern layer covers the first bridge lines. Next, the second bridge lines are formed and cross over the light shielding pattern layer covering the first bridge lines so as to electrically connect the second touch sensors in the same row.

In one embodiment of the present invention, a method of forming the first film, the second film, and the light shielding pattern layer includes the following steps. Firstly, the second bridge lines are formed on the substrate. Then, the light shielding pattern layer is formed on the second bridge lines. In addition, the light shielding pattern layer exposes both ends of the second bridge lines. Afterward, the first touch sensors, the second touch sensors, and the first bridge lines which cross over the second bridge lines so as to electrically connect the first sensors in the same column are formed on the light shielding pattern layer. Moreover, the second touch sensors contact with the exposed second bridge lines such that the second touch sensors in the same row are electrically connected with each other.

In one embodiment of the present invention, a manufacturing method of the aforementioned color filter touch sensing substrate further includes forming a plurality of periphery circuit which is electrically connected to the first touch sensors and the second touch sensors.

In one embodiment of the present invention, the manufacturing method further includes forming at least an alignment pattern in the periphery of the substrate.

In one embodiment of the present invention, each of the second bridge lines crosses over the light shielding pattern layer between two adjacent sub-pixel regions, such that the second touch sensors in the same row are electrically connected.

In one embodiment of the present invention, a width of the light shielding pattern layer is smaller than a width of the first bridge lines, and each of the second bridge lines crosses over at least two sub-pixel regions so that the second touch sensors in the same row are electrically connected.

In one embodiment of the present invention, the abovementioned manufacturing method of color filter touch sensing substrate can further include the following steps. Firstly, a covering layer is formed on the color filter pattern layers. Afterward, an electrode layer is formed on the covering layer.

In one embodiment of the present invention, a material of the second bridge lines is metal or a transparent conductive material.

In one embodiment of the present invention, a material of the light shielding pattern layer includes black resin.

The present invention provides a color filter touch sensing substrate, which includes a first film, a second film, a light shielding pattern layer, and a plurality of color filter pattern layers. The first film is disposed on a substrate. Moreover, the first film includes a plurality of first touch sensors, a plurality of second touch sensors, and a plurality of first bridge lines used to electrically connect the first touch sensors in the same column. In addition, the second film is disposed on the substrate. The second film includes a plurality of second bridge lines used to electrically connect the second touch sensors in the same row. Furthermore, the light shielding pattern layer is disposed between the first film and the second film to define a plurality of sub-pixel regions on the substrate. Here, a portion of the light shielding pattern layer is disposed at junctions between the second bridge lines and the first bridge lines. Additionally, the color filter pattern layers are disposed within the sub-pixel regions.

In one embodiment of the present invention, the first touch sensor, the second touch sensor, and the first bridge lines are disposed on a surface of the substrate. Moreover, the light shielding pattern layer is disposed on the first touch sensors and the second touch sensors, where a portion of the light shielding pattern layer covers the first bridge lines. Besides, the second bridge lines cross over the light shielding pattern layer covering the first bridge lines so as to electrically connect the second touch sensors in the same row.

In one embodiment of the present invention, the second bridge lines are disposed on a surface of the substrate. Also, the light shielding pattern layer is disposed on the second bridge lines, and the light shielding pattern layer exposes two ends of the second bridge lines. The first touch sensors, the second touch sensors, and the first bridge lines are disposed on the light shielding pattern layer. Furthermore, the first bridge lines cross over the second bridge lines so as to electrically connect the first touch sensors in the same column. Also, the second touch sensors in the same row are electrically connected to each other through the exposed second bridge lines.

In one embodiment of the present invention, the color filter touch sensing substrate further includes at least an alignment pattern and a plurality of periphery circuit. The alignment pattern is disposed in the periphery of the substrate. In addition, the periphery circuit is electrically connected to the first touch sensors and the second touch sensors.

In one embodiment of the present invention, each of the second bridge lines crosses over the light shielding pattern layer between two adjacent sub-pixel regions, such that the second touch sensors in the same row are electrically connected.

In one embodiment of the present invention, a width of the light shielding pattern layer is smaller than a width of the first bridge lines, and each of the second bridge lines crosses over at least two sub-pixel regions so that the second touch sensors in the same row are electrically connected.

In one embodiment of the present invention, the color filter touch sensing substrate can further include a covering layer and an electrode layer. The covering layer is disposed on the color filter pattern layers. Moreover, the electrode layer is disposed on the covering layer.

In one embodiment of the present invention, a material of the second bridge lines is metal or a transparent conductive material.

In one embodiment of the present invention, a material of the light shielding pattern layer includes black resin.

The present invention provides a manufacturing method of a display panel which includes following steps. Firstly, a first film is formed on a substrate. Moreover, the first film includes a plurality of first touch sensors, a plurality of second touch sensors, and a plurality of first bridge lines used to electrically connect the first touch sensors in the same column. Then, a second film is formed on the substrate. The second film includes a plurality of second bridge lines used to electrically connect the second touch sensors in the same row. Next, a light shielding pattern layer is formed between the first film and the second film. The light shielding pattern layer is used to define a plurality of sub-pixel regions on the substrate. Herein, a portion of the light shielding pattern layer is disposed at junctions between the second bridge lines and the first bridge lines. Next, a plurality of color filter pattern layers is formed in the sub-pixel regions to form a color filter touch sensing substrate. Then, an active device array substrate is provided. Additionally, the active device array substrate and the color filter touch sensing substrate are assembled together. Afterward, a liquid crystal layer is filled between the active device array substrate and the color filter touch sensing substrate.

The present invention provides a display panel, which includes a color filter touch sensing substrate, an active device array substrate, and a liquid crystal layer. The color filter touch sensing substrate includes a first film, a second film, a light shielding pattern layer, and a plurality of color filter pattern layers. The first film is disposed on a substrate. Moreover, the first film includes a plurality of first touch sensors, a plurality of second touch sensors, and a plurality of first bridge lines used to electrically connect the first touch sensors in the same column. The second film is disposed on the substrate. Furthermore, the second film includes a plurality of second bridge lines used to electrically connect the second touch sensors in the same row. In addition, the light shielding pattern layer is disposed between the first film and the second film to define a plurality of sub-pixel regions on the substrate. Herein, a portion the light shielding pattern layer is disposed at junctions between the second bridge lines and the first bridge lines. The color filter pattern layers are disposed in the sub-pixel regions. Also, the active device array substrate is disposed opposite to the color filter substrate. Moreover, the liquid crystal layer is disposed between the active device array substrate and the color filter touch sensing substrate.

The present invention uses the light shielding pattern layer as an insulation structure between the first and the second bridge lines, and does not use a Chromium black matrix as a touch sensor, thus the present invention will not have the problem of weak touch signals.

The present invention utilizes the light shielding pattern layer as the insulation structure, which omits a structure required in the manufacture of the insulation layer. Hence, this integrated structure may achieve the goal of simplifying the manufacturing process and reduces production cost.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A to FIG. 3D are schematic flow diagrams showing steps in a manufacturing process of another color filter touch sensing substrate according to an embodiment of the present invention.

DESCRIPTION OF EMBODIMENTS

Figure 1A:
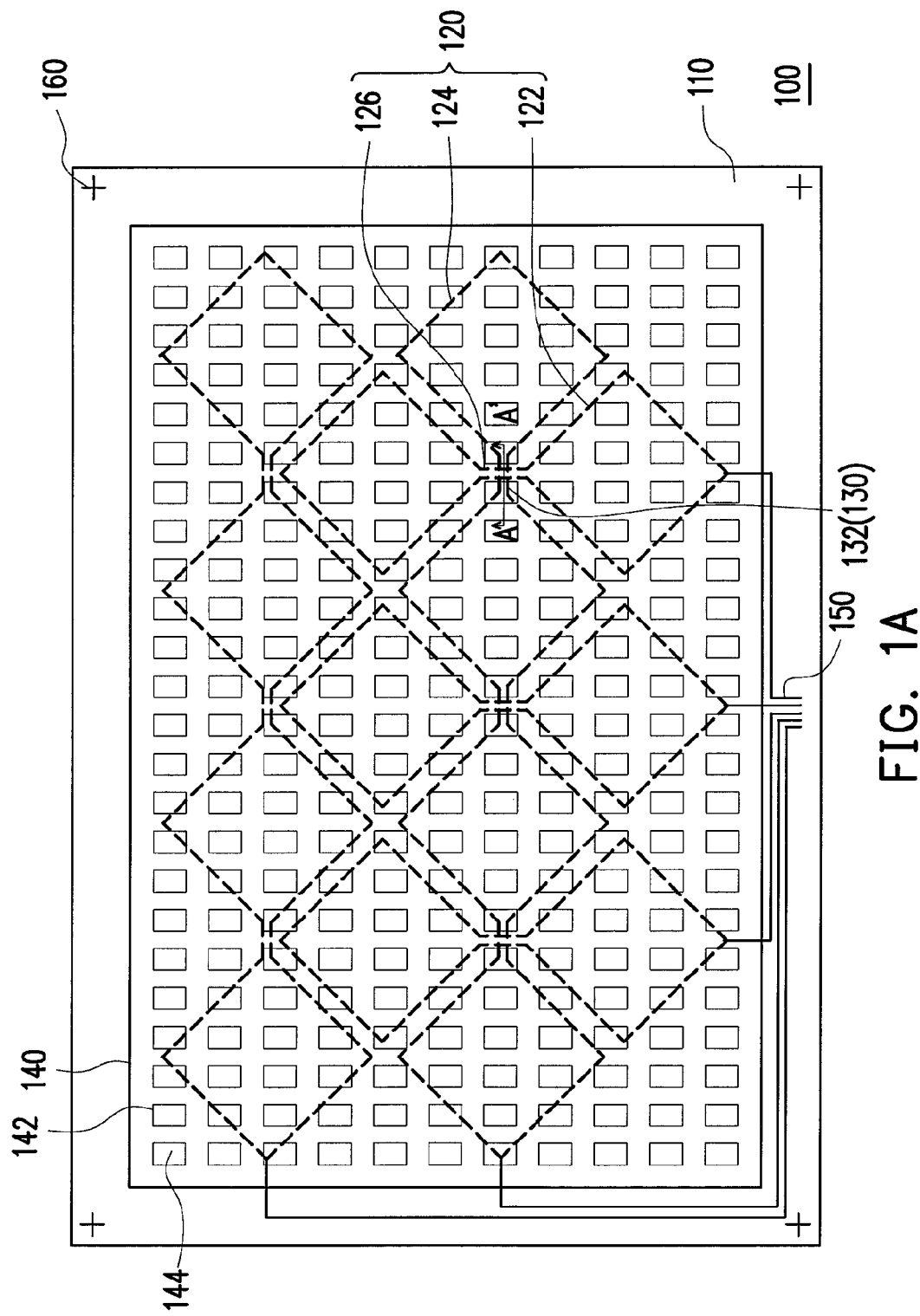
FIG. 1A is a top view of a color filter touch sensing substrate according to an embodiment of the present invention.
Figure 1B:
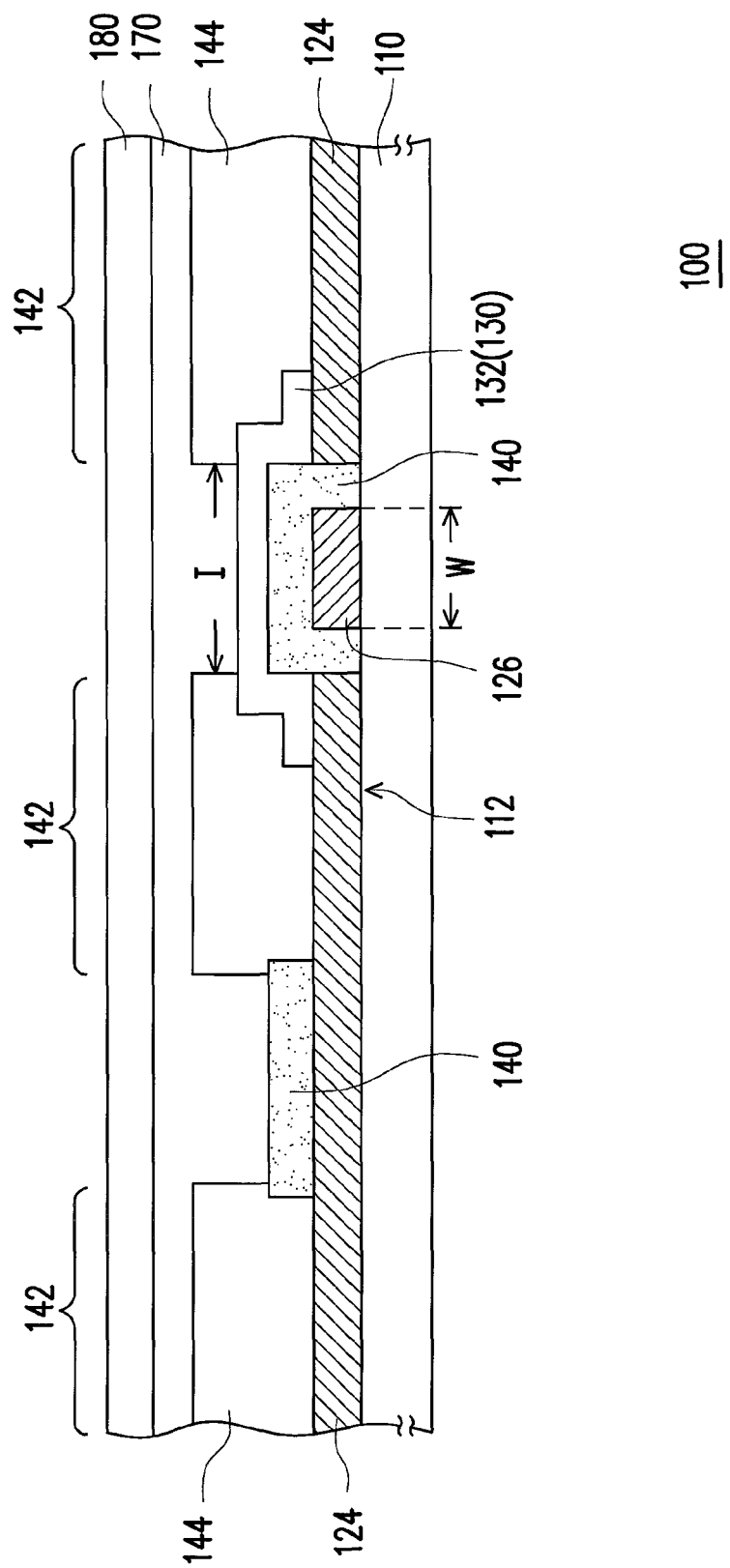
FIG. 1B is a cross-sectional view of FIG. 1A along line A-A'.

FIG. 1A is a top view of a color filter touch sensing substrate according to an embodiment of the present invention. FIG. 1B is a cross-sectional view of FIG. 1A along line A-A'. Referring to FIG. 1A and FIG. 1B simultaneously, a color array substrate 100 in the present embodiment includes a first film 120, a second film 130, a light shielding pattern layer 140, and a plurality of color filter pattern layers 144.

The first film 120 is a first conductive pattern layer which is disposed on a substrate 110. The first film 120 includes a plurality of first touch sensors 122, a plurality of second touch sensors 124, and a plurality of first bridge lines 126 used to electrically connect the first touch sensors 122 in the same column. A material of the first film 120 is a transparent conductive material, for example, indium tin oxide (ITO) or indium zinc oxide (IZO), etc.

Moreover, the second film 130 is a second conductive pattern layer which includes a plurality of second bridge lines 132, and is disposed above the first film 120. The function of the second bridge lines 132 is to electrically connect the second touch sensors 124 in the same row. In the present embodiment, a material of the second bridge lines 132 is, for example, metal or a transparent conductive material. Here, the metal may be copper, aluminum, titanium, molybdenum, silver or gold, etc. The transparent conductive material may be ITO or IZO, etc. Moreover, the second bridge lines 132 may be a single layer or stacked layers of the aforementioned materials.

Furthermore, the light shielding pattern layer 140 is disposed between the first film 120 and the second film 130. Also, the light shielding pattern layer 140 is used to define a plurality of sub-pixel regions 142 on the substrate 110. Herein, a portion of the light shielding pattern layer 140 is disposed at junctions between the second bridge lines 132 and the first bridge lines 126. In the present embodiment, a material of the light shielding pattern layer 140 is a shielding insulating material, for example, black resin.

Moreover, the color filter pattern layers 144 are disposed within the sub-pixel regions 142 and covering a portion of the second bridge lines 132. In the present embodiment, the color filter pattern layers 144 are, for example, red filter pattern layers, green filter pattern layers, and blue filter pattern layers. An arrangement of the red, green, and blue filter pattern layers in the color filter pattern layers 144 is not limited in the present invention.

More specifically, in the present embodiment, the first touch sensors 122, the second touch sensors 124, and the first bridge lines 126 are disposed on a surface 112 of the substrate 110. The light shielding pattern layer 140 is disposed on the first touch sensors 122, the second touch sensors 124, and the first bridge lines 126. The second bridge lines 132 cross over the light shielding pattern layer 140 above the first bridge lines 126, and are electrically connected to the second touch sensors 124 on the two sides. Especially, in the present embodiment, a width W of the first bridge lines 126 is smaller than or equal to a pattern width I (a distance between two sub-pixel regions 142) of the light shielding pattern layer 140. Therefore, the light shielding pattern layer 140 covers the first bridge lines 126 such that the first bridge lines 126 are separated from the film above. As the second bridge lines 132 and the first bridge lines 126 above the light shielding pattern layer 140 are separated by the light shielding pattern layer 140, short circuit will not occur between the bridge lines.

In the present embodiment, as illustrated in FIG. 1B, the color filter touch sensing substrate 100 can further include a covering layer 170 and an electrode layer 180. The covering layer 170 forms a flat surface and that is disposed on the color filter pattern layers 144. Moreover, the electrode layer 180 is disposed on the covering layer 170.

Besides, in the present embodiment, as illustrated in FIG. 1A, the color filter touch sensing substrate 100 can further include a plurality of periphery circuit 150 and at least an alignment pattern 160. The periphery circuit 150 is electrically connected to the first touch sensors 122 and the second touch sensors 124. In other words, the first touch sensors 122 in the same column will be electrically connected to one of the periphery circuit 150 and the second touch sensors 124 in the same row will be electrically connected to one of the periphery circuit 150, such that signals generated on the touch sensors 122 and 124 are exported. In addition, the alignment pattern 160 is disposed in the periphery of the substrate 110 to provide an alignment reference coordinate needed in a manufacturing process.

The manufacturing method of the color filter touch sensing substrate 100 has multiple embodiments. The following embodiments are used to illustrate the manufacturing method of the color filter touch sensing substrate 100; however, the present invention is not limited therein.

Figure 2A:
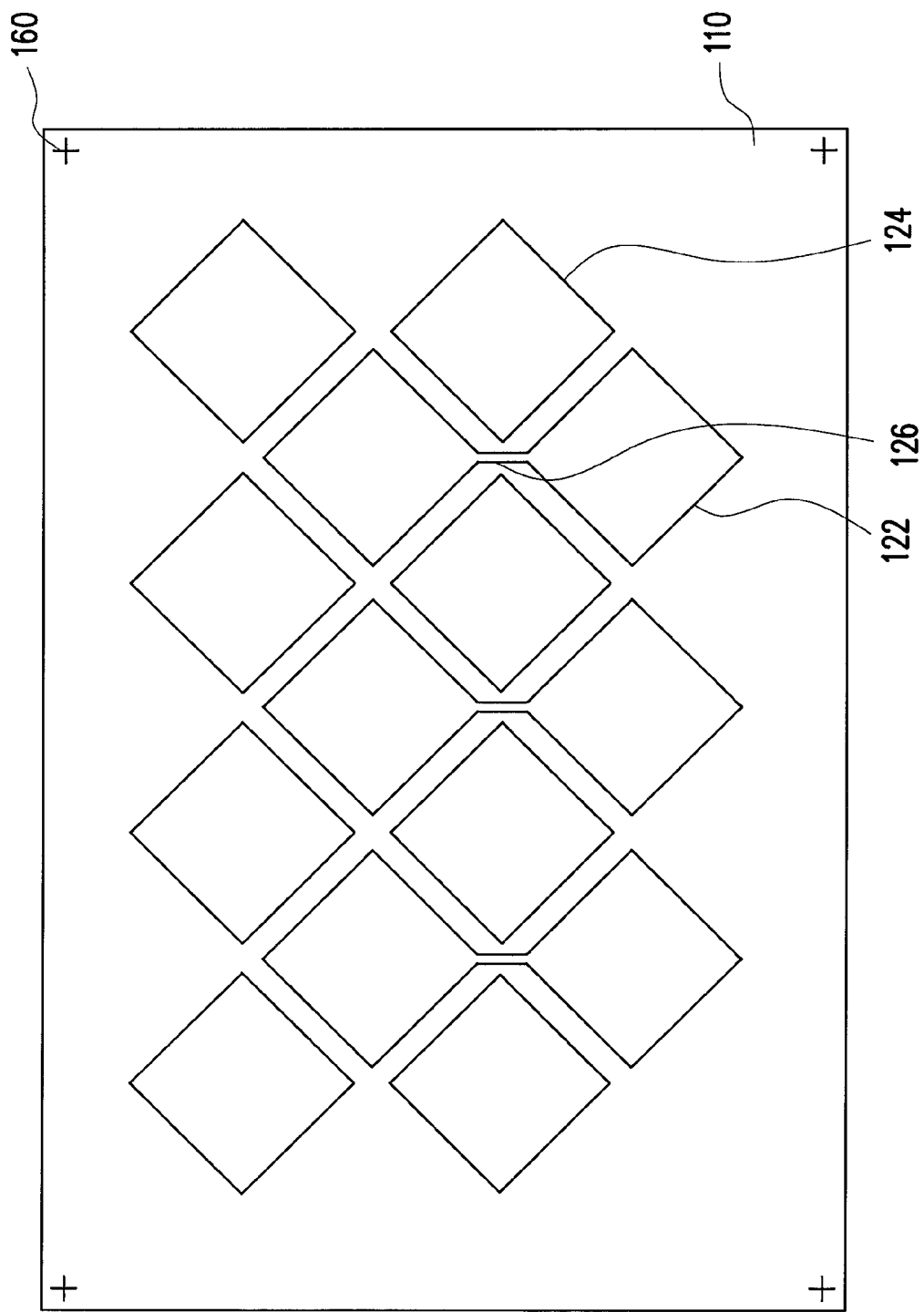
FIG. 2A to FIG. 2D are schematic flow diagrams showing steps in a manufacturing process of a color filter touch sensing substrate according to an embodiment of the present invention.

FIG. 2A to FIG. 2D are schematic flow diagrams showing steps in a manufacturing process of a color filter touch sensing substrate according to an embodiment of the present invention. Referring to FIG. 2A, firstly, the first touch sensors 122, the second touch sensors 124, and the first bridge lines 126 used to electrically connect the first touch sensors 122 in the same column are formed on the substrate 110. In the present embodiment, the formation of the first touch sensors 122, the second touch sensors 124, and the first bridge lines 126 further includes forming the alignment pattern 160 at the same time. In the present embodiment, a material of the first touch sensors 122, the second touch sensors 124, the first bridge lines 126, and the alignment pattern 160 is, for example, ITO, IZO, or other transparent conductive materials.

Figure 2B:
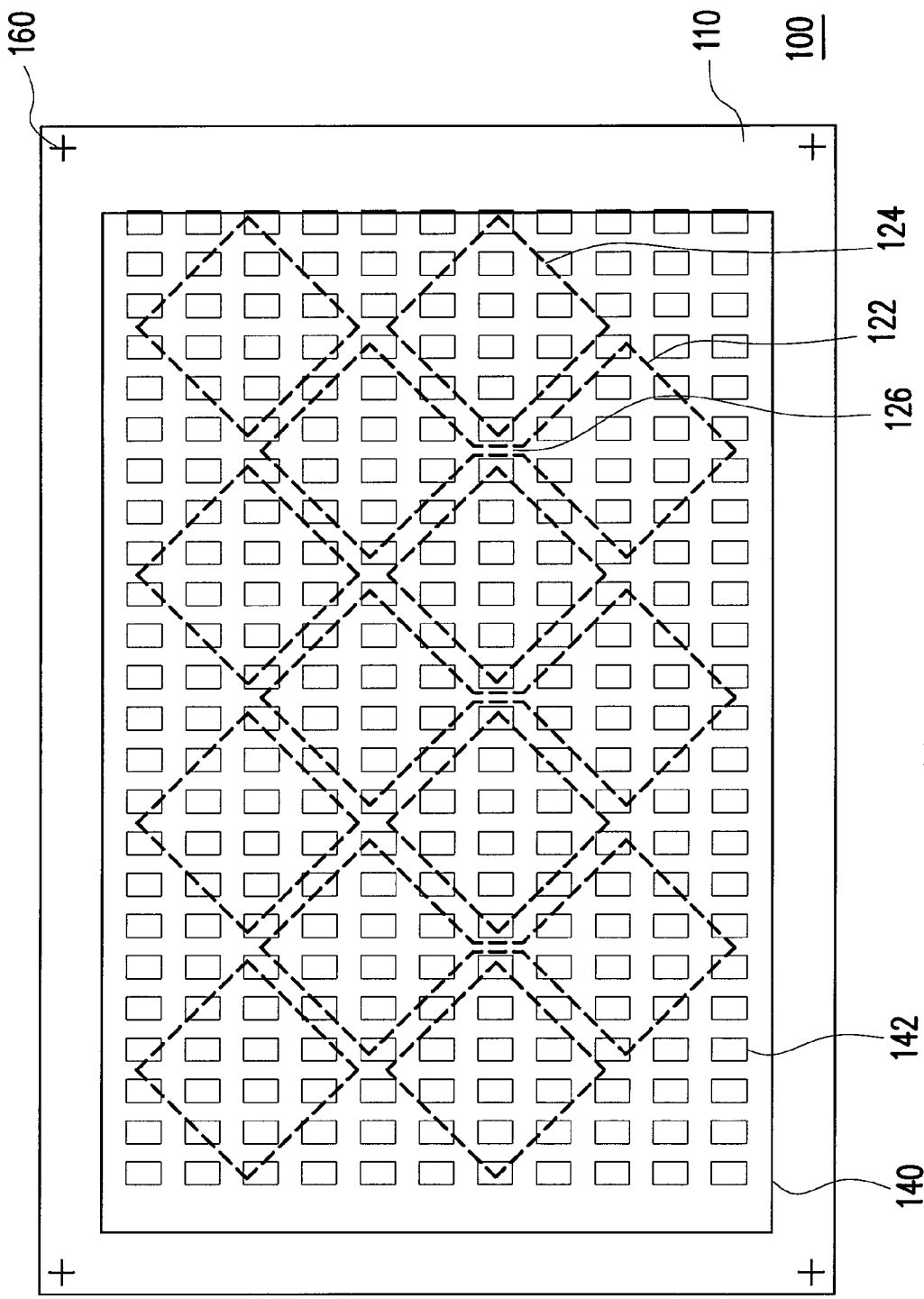

Referring to FIG. 2B, afterwards, the light shielding pattern layer 140 is formed on the substrate 110 to cover the first touch sensors 122, the second touch sensors 124, and the first bridge lines 126. More particularly, the light shielding pattern layer 140 defines a plurality of sub-pixel regions 142 on the substrate 110. The light shielding pattern layer 140 covers the first bridge lines 126 to separate the first bridge lines 126 and a film subsequently formed above the light shielding pattern layer 140. A material used by the light shielding pattern layer 140 of the present embodiment is, for example, black resin or other materials with insulating effects. Hence, the light shielding pattern layer 140 covered on the first bridge lines 126 have an effect of electrical isolation.

Figure 2C:
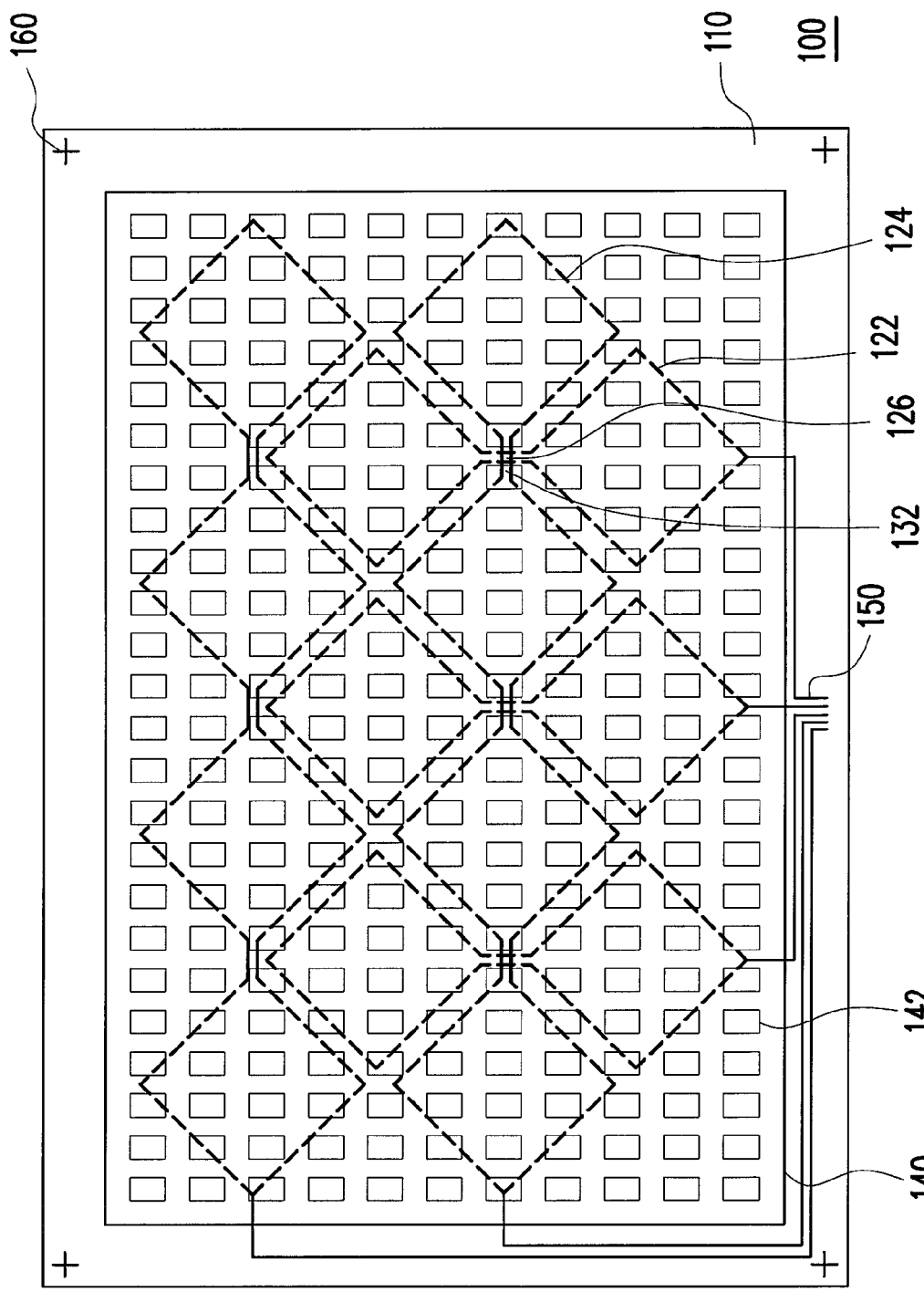

Referring to FIG. 2C, the second bridge lines 132 are formed on the substrate 110 so as to electrically connect the second touch sensors 124 in the same row. More particularly, the second bridge lines 132 cross over the light shielding pattern layer 140 covering the first bridge lines 126. Since the light shielding pattern layer 140 can separate the first bridge lines 126 and the second bridge lines 132, short circuit will not occur between the first bridge lines 126 and the second bridge lines 132. In the present embodiment, the second bridge lines 132 cross over the light shielding pattern layer 140 between two adjacent sub-pixel regions 142. The material of the second bridge lines 132 is, for example, ITO, IZO, or other transparent conductive materials. On the other hand, the second bridge lines 132 may also be a single layer or stacked layers of copper, aluminum, titanium, molybdenum, silver, or gold, but is not limited thereto. In addition, in the present embodiment, the periphery circuit 150 can be formed while forming the second bridge lines 132. The material of the second bridge lines 132 and the periphery circuit 150 is, for example, a single layer or stacked layers of copper, aluminum, titanium, molybdenum, silver, or gold, but is not limited thereto.

Figure 2D:
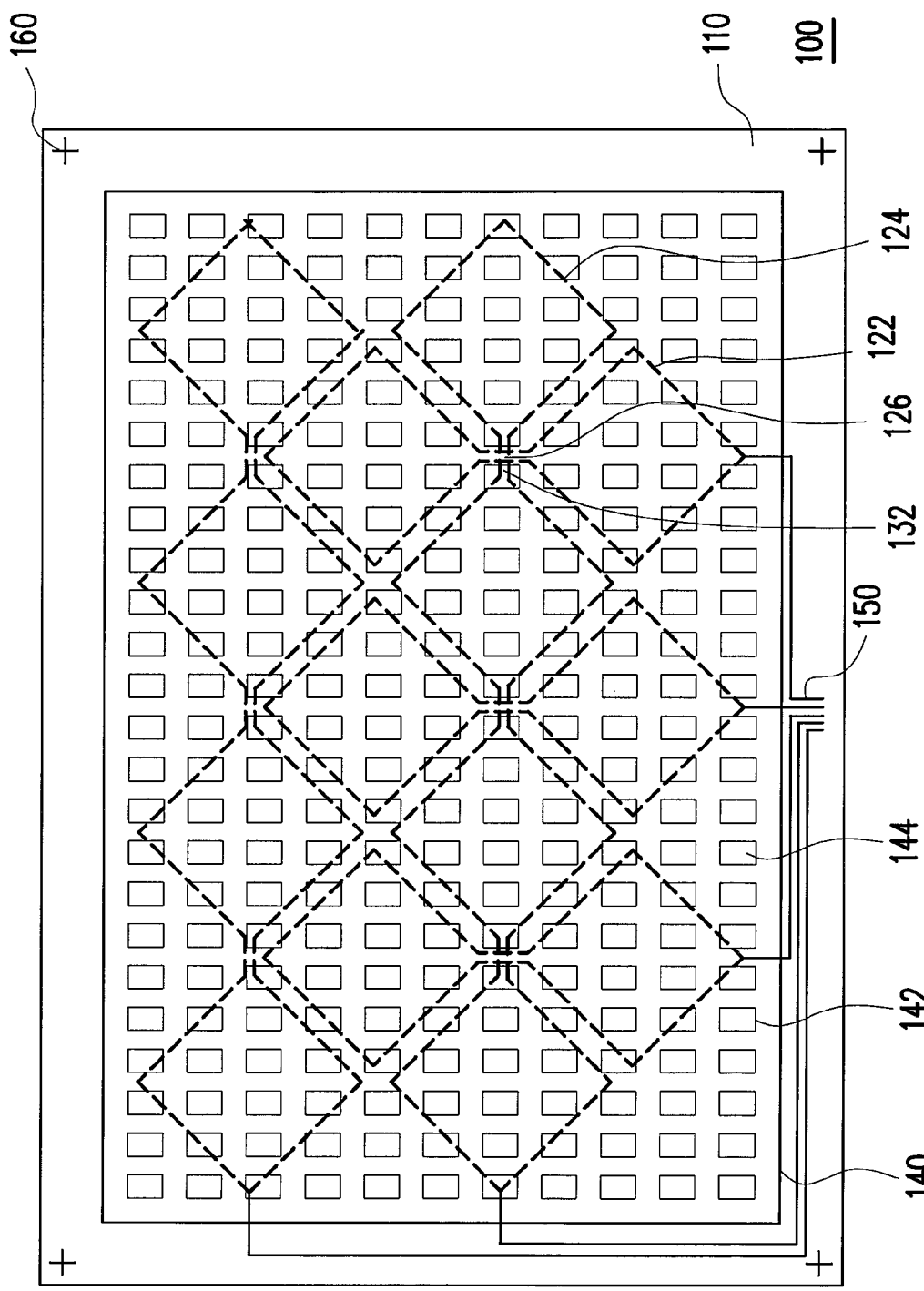

FIG. 2D will be referred to upon completion of the aforementioned steps. Next, the color filter pattern layers 144 are formed in the sub-pixel regions 142 defined by the light shielding pattern layer 140. In the present embodiment, the method of forming the color filter pattern layers is filling color filter pattern layers 144 sequentially to the sub-pixel regions 142 in the same column. For instance, the sub-pixel regions 142 in the same column are first filled with the red color filter pattern layers 144. Then, the sub-pixel region 142 in the next column is filled with the green color filter pattern layers 144. Then, the sub-pixel regions 142 in the next column are filled with the blue color filter pattern layers 144. It should be noted that the filling of the sub-pixel regions 142 with the color filter pattern layers 144 of the same color is performed with a coating process, but is not limited thereto. In other words, all the red color filter pattern layers 144 will fill into the corresponding sub-pixel regions 142 simultaneously, all the green color filter pattern layers 144 will fill into the corresponding sub-pixel regions 142 simultaneously, and all the blue color filter pattern layers 144 will fill into the corresponding sub-pixel regions 142 simultaneously.

Afterward, a covering layer and an electrode layer (such as the covering layer 170 and the electrode layer 180 shown in FIG. 1B) may be further formed on the color filter pattern layers 144.

Figure 3B:
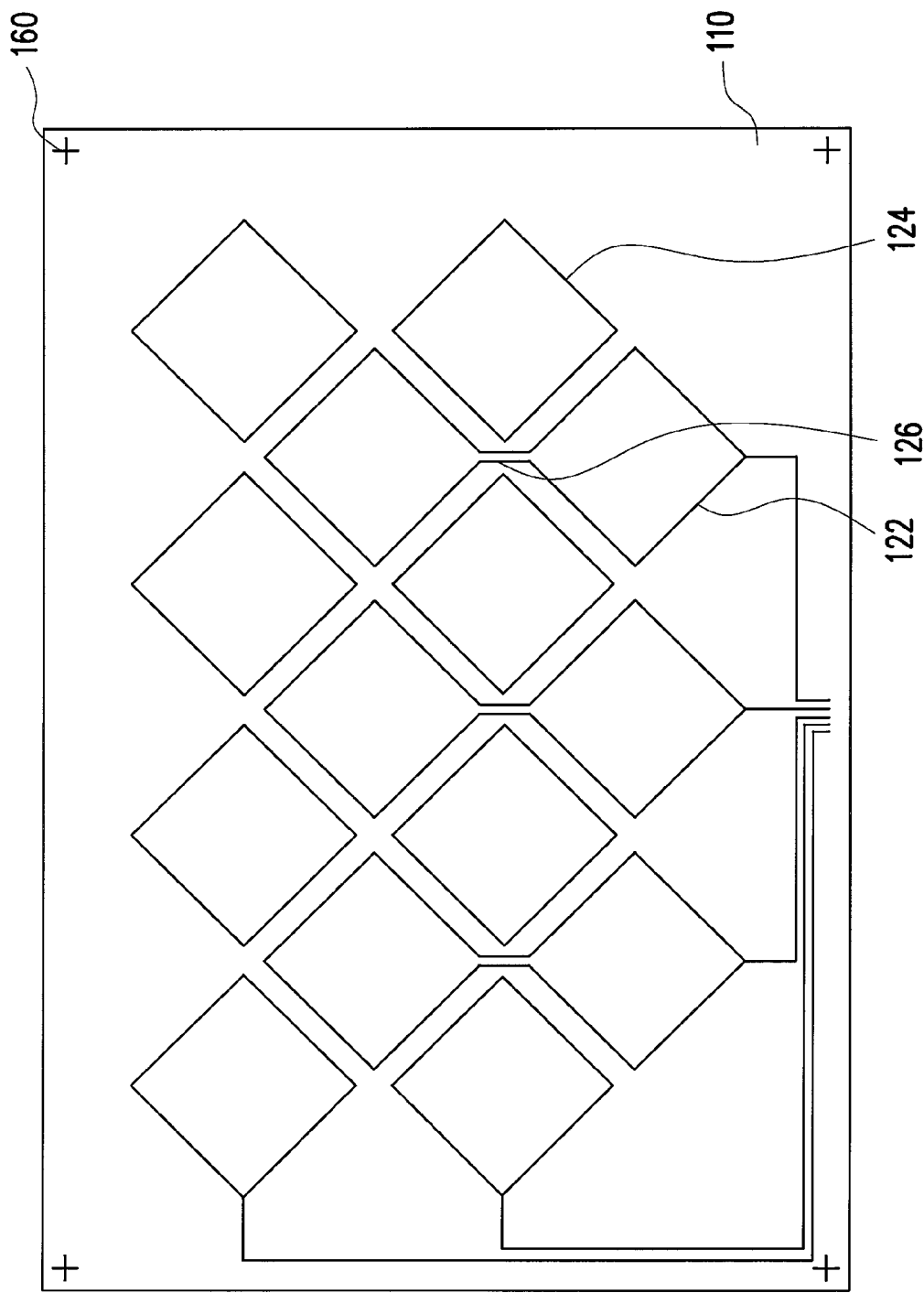

FIG. 3A to FIG. 3D are schematic flow diagrams showing steps in a manufacturing process of another color filter touch sensing substrate according to an embodiment of the present invention. Referring to FIG. 3A, firstly, the periphery circuit 150 and the alignment pattern 160 are formed on the substrate 110. In the present embodiment, the substrate 110 may be, for example, a glass substrate, a quartz substrate, a plastic substrate, or other suitable substrates. Furthermore, the material of the periphery circuit 150 and the alignment pattern 160 may be selected from metals or other conductive materials.

Referring to FIG. 3B, next, the first touch sensors 122, the second touch sensors 124, and the first bridge lines 126 are formed on the substrate 110. It should be noted that in the present embodiment, the first touch sensors 122 in the same column are electrically connected through the first bridge lines 126. Moreover, the first touch sensor 122 located in the bottom-most (or the top-most, the left-most, the right-most) of each column will be connected to one of the previously formed periphery circuit 150. Moreover, the second touch sensors 124 of each row will be connected to one of the periphery circuit 150. FIG. 3B shows the left-most second touch sensors 124 connected to the periphery circuit 150, but the present invention is not limited thereto, and the most suitable position is applied according to actual needs. In the present embodiment, the material of the first touch sensors 122, the second touch sensors 124, and the first bridge lines 126 is, for example, ITO, IZO, or other transparent conductive materials.

Figure 3C:
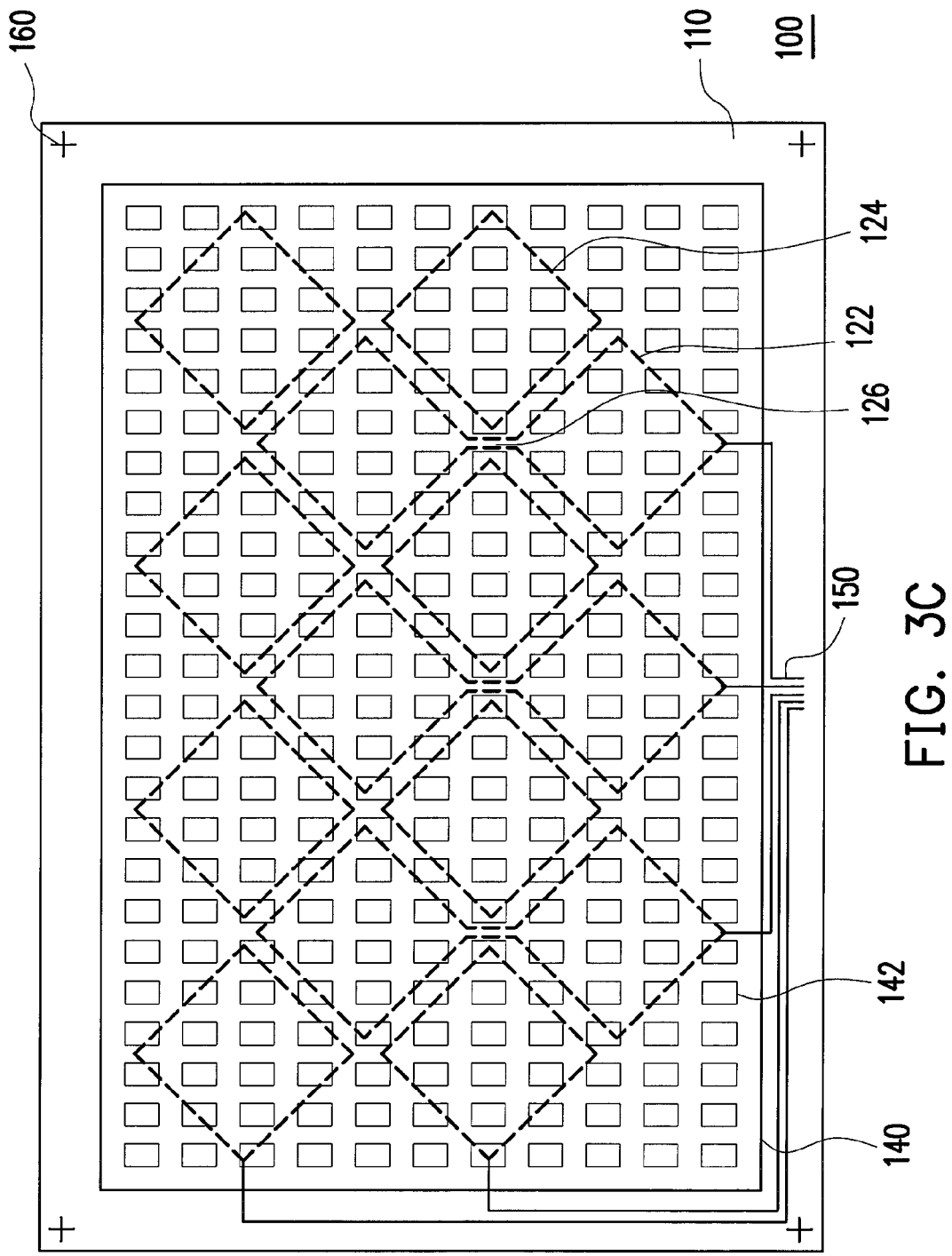

Referring to FIG. 3C, the light shielding pattern layer 140 is formed in the substrate 110. Herein, a portion of the light shielding pattern layer 140 covers the first bridge lines 126. Thus, the light shielding pattern layer 140 prevents the first bridge lines 126 from electrically contacting the film subsequently formed above the light shielding pattern layer 140 to result in short circuit.

Figure 3D:
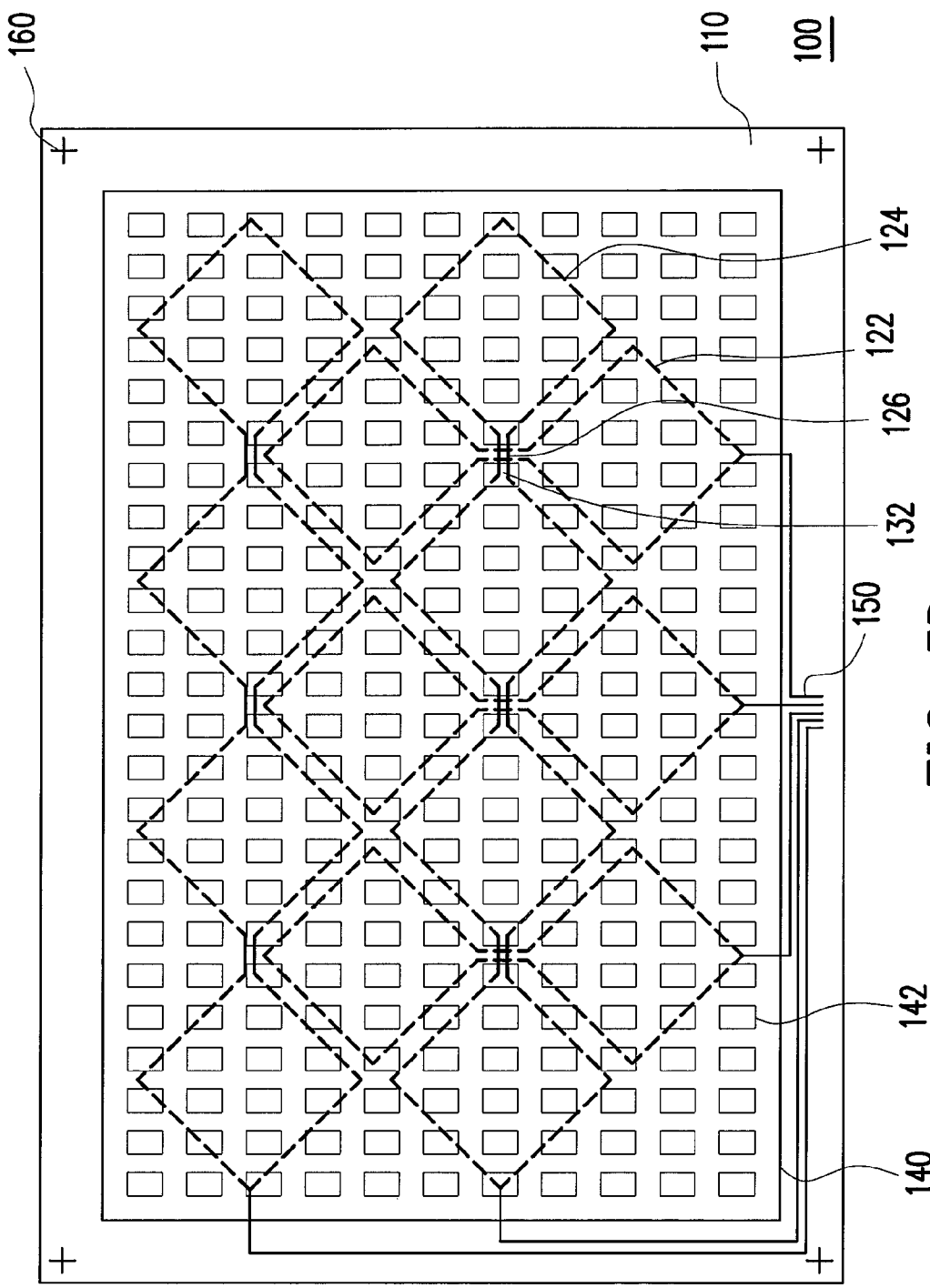

Referring to FIG. 3D, the second bridge lines 132 are formed on the substrate 110, and the second bridge lines 132 are used to electrically connect two adjacent second touch sensors 124. In the present embodiment, the material of the second bridge lines 132 is, for example, ITO, IZO, or other transparent conductive materials.

Upon completion of the steps aforementioned, the manufacturing process of the color filter pattern layers, the covering layer, and the electrode layer is performed. However, the manufacturing method is identical to the method described in the above-mentioned embodiment, thus is not repeated herein.

Figure 4A:
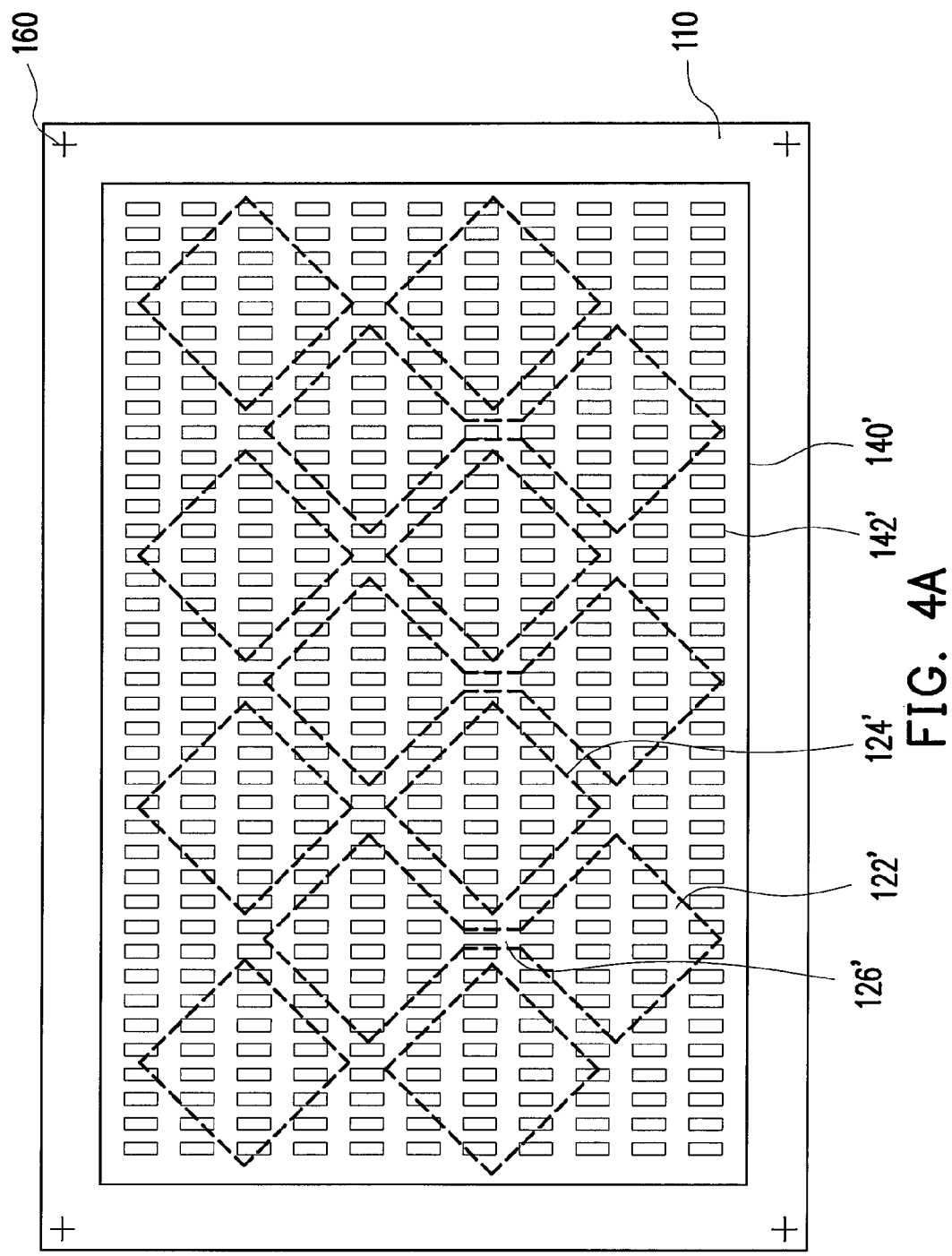
FIGS. 4A to 4C are schematic flow diagrams showing steps in a manufacturing method of a color filter touch sensing substrate according to another embodiment of the present invention.
Figure 4B:
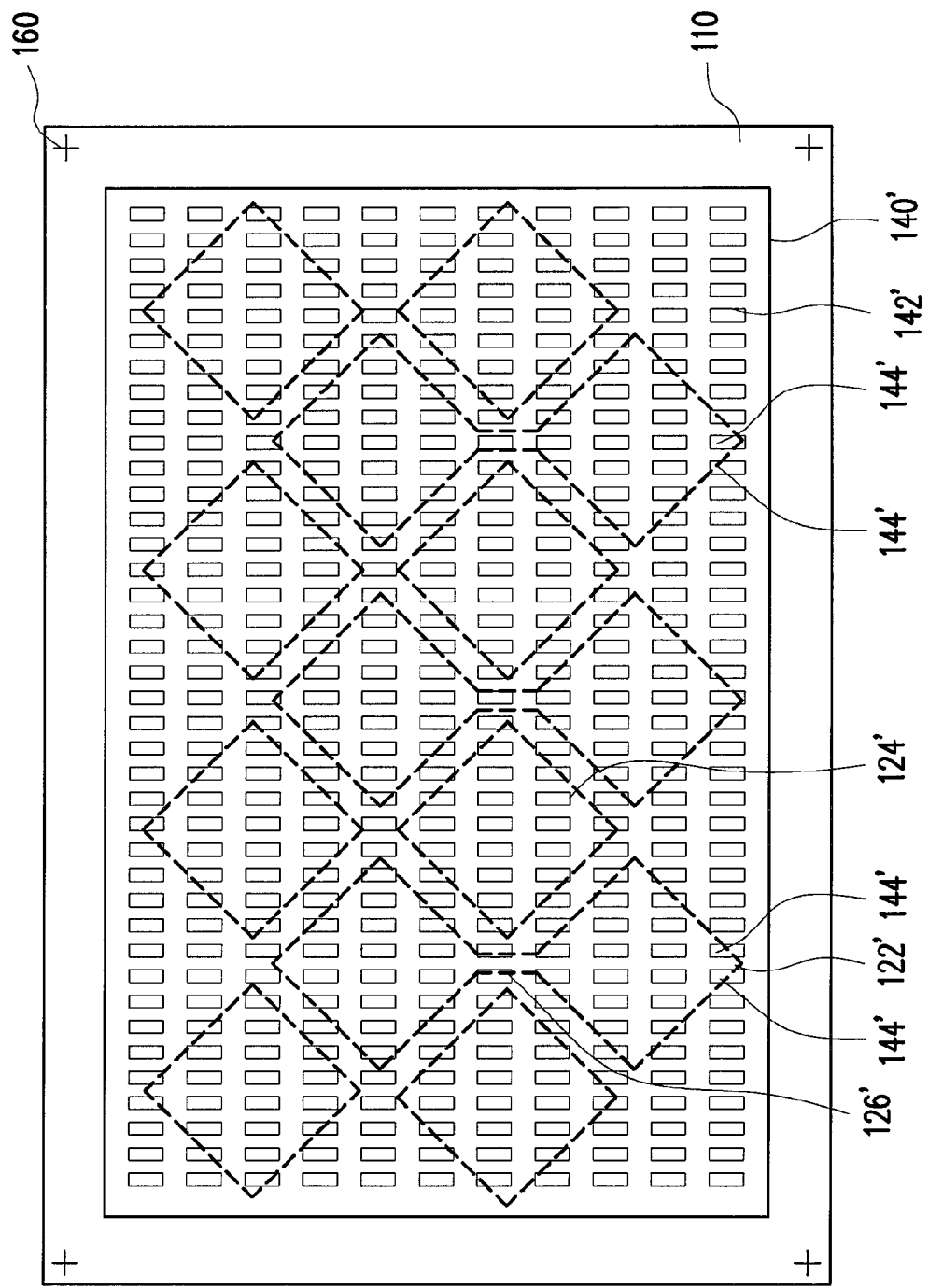
Figure 4C:
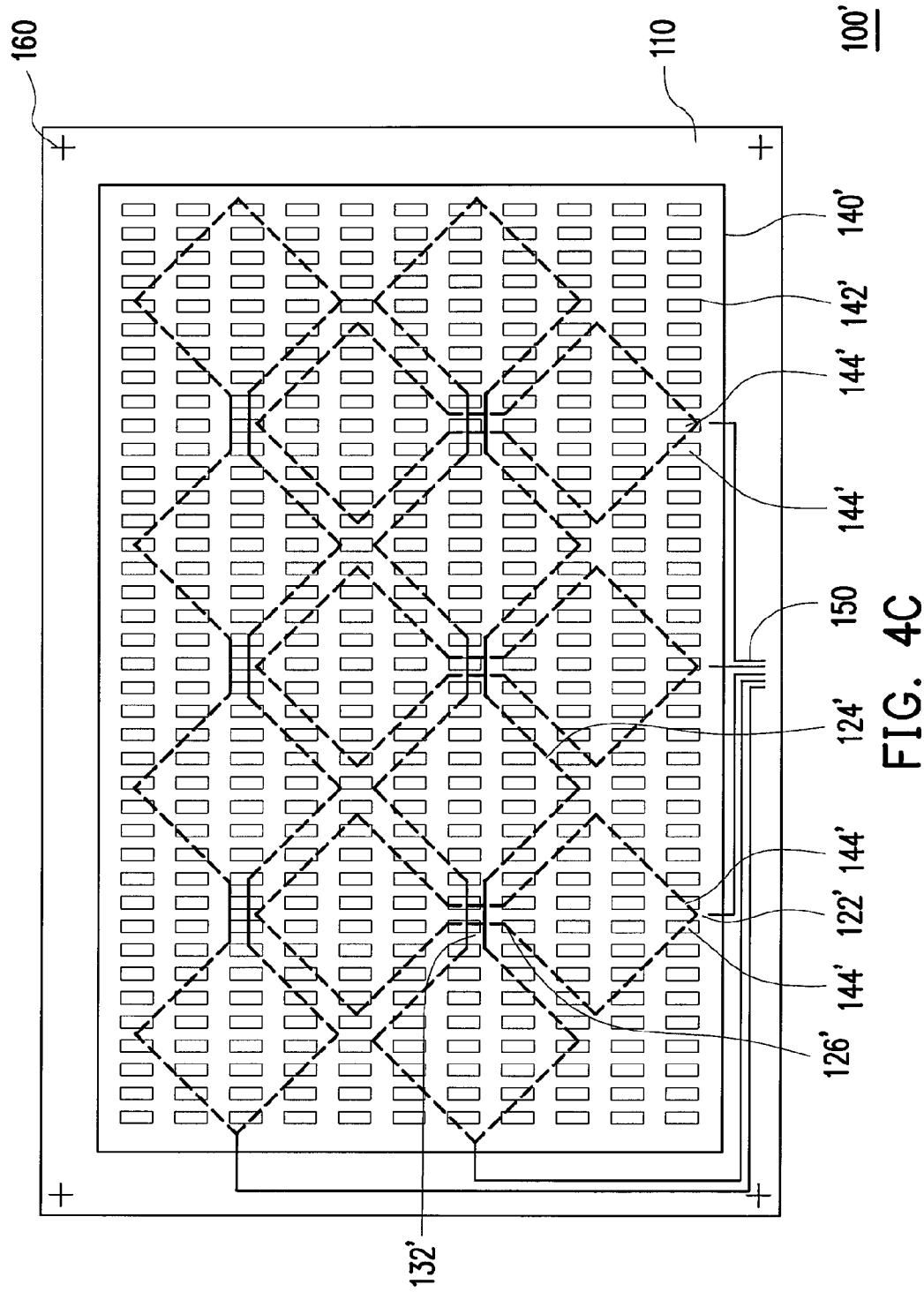

In another embodiment, a manufacturing method of another color filter touch sensing substrate is provided as follows. FIGS. 4A to 4C are schematic flow diagrams showing steps in a manufacturing method of a color filter touch sensing substrate according to another embodiment of the present invention. A manufacturing method of a color filter touch sensing substrate 100' in the present embodiment is similar to that of the color filter touch sensing substrate 100.

Firstly, the step shown in FIG. 2A is performed. A plurality of first touch sensors 122', a plurality of second touch sensors 124', and a plurality of first bridge lines 126' are formed on the substrate 110. Next, referring to FIG. 4A, a light shielding pattern layer 140' is formed on the substrate 110 to define a plurality of sub-pixel regions 142'. It should be noted that in the color filter touch sensing substrate 100' of the present embodiment, a width of the light shielding pattern layer 140' is smaller than a width of the first bridge lines 126'. In other words, the light shielding pattern layer 140 does not cover the first bridge lines 126' completely, so that a portion of the first bridge lines 126' is exposed.

Next, referring to FIG. 4B, one or two color filter pattern layer(s) 144' is formed in the sub-pixel regions 142' defined by the light shielding pattern layer 140'. In the present embodiment, two color filter pattern layers 144' are formed first, such as the red and the green color filter pattern layers. It should be noted that, a portion of the sub-pixel regions 142' are not filled with the color filter pattern layer 144', so that ends or a portion of the second touch sensors 124' will still be exposed. The reason of the aforementioned step is that the width of the light shielding pattern layer 140' in the present embodiment is smaller than the width of the first bridge lines 126'. Therefore, the light shielding pattern layer 140' can not cover the first bridge lines 126' completely, and thus can not achieve an insulation effect completely. Hence, the color filter pattern layers 144' are used in the present embodiment to facilitate the insulation performance. More specifically, the color filter pattern layers 144' are filled into the sub-pixel regions 142' so as to completely cover the portion of the first bridge lines 126' unshielded by the light shielding pattern layer 140'. Consequently, the purpose of preventing the first bridge lines 126' to contact with other circuits can be accomplished.

Referring to FIG. 4C, a plurality of second bridge lines 132' is then formed on the substrate 110. In the present embodiment, as the width of the light shielding pattern layer 140' is smaller than the width of the first bridge lines 126', in order to cover the first bridge lines 126' completely with the light shielding pattern layer 140' and the color filter pattern layers 144', the second bridge lines 132' cross over at least two sub-pixel regions 142' so as to electrically connect the second touch sensors 124' in the same column. More particularly, since a portion of the sub-pixel regions 142' is not filled with the color filter pattern layers 144' in the previous steps of FIG. 4B, ends or a portion of the second touch sensors 124' will be exposed. Therefore, the second bridge lines 132' can use regions of the sub-pixel regions 142' that are unfilled with the color filter pattern layers 144' to electrically connect two adjacent second touch sensors 124'.

Upon completion of the steps aforementioned, the sub-pixel regions 142' lacking the color filter pattern layer formation are filled with the color filter pattern layers 144', for example, the blue color filter pattern layers. Afterward, a covering layer and an electrode layer (such as the covering layer 170 and the electrode layer 180 shown in FIG. 1B) are similarly formed on the color filter pattern layers 144' in sequence.

Figure 5A:
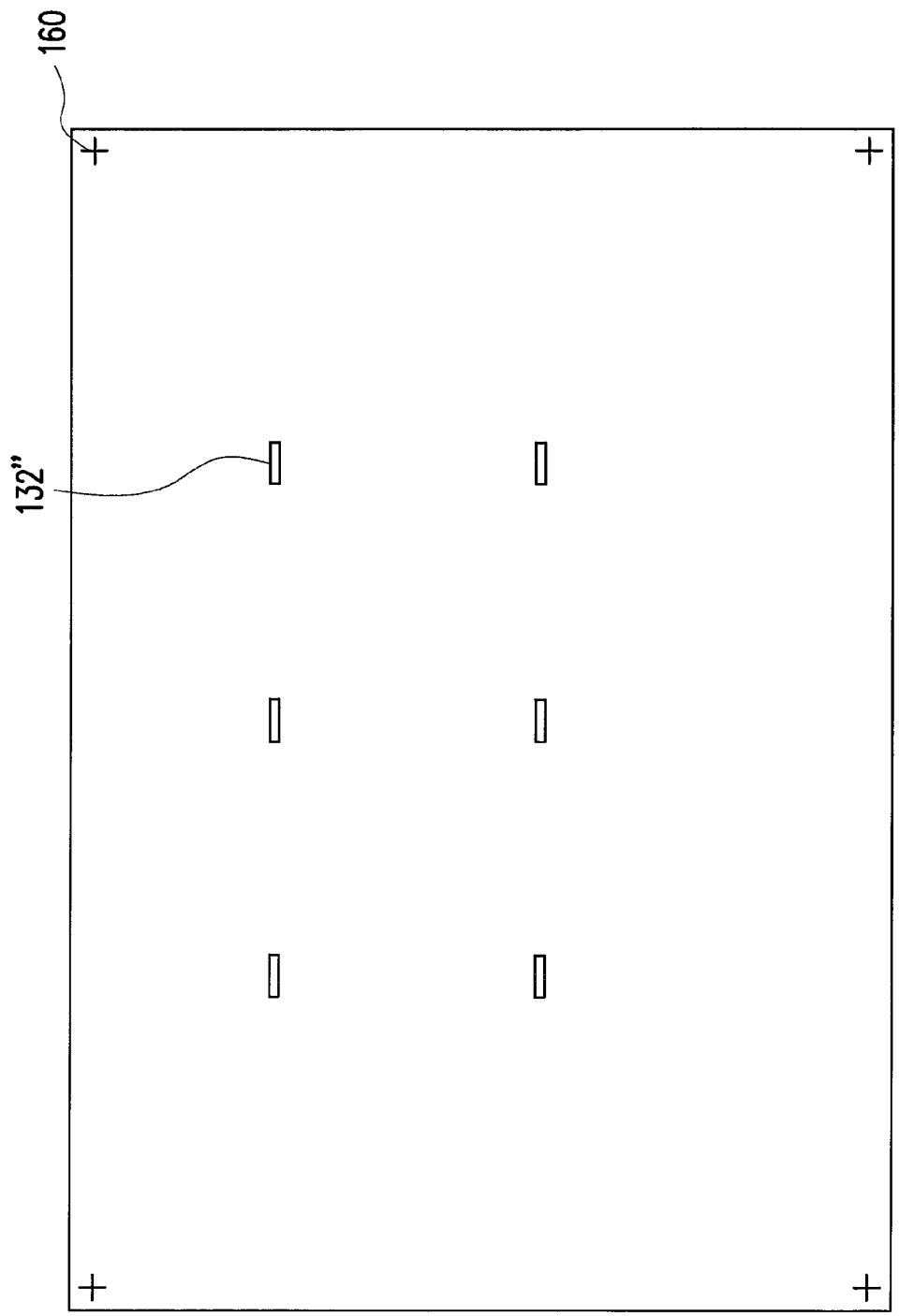
FIGS. 5A to 5C are schematic flow diagrams showing steps in a manufacturing method of a color filter touch sensing substrate according to another embodiment of the present invention.
Figure 5B:
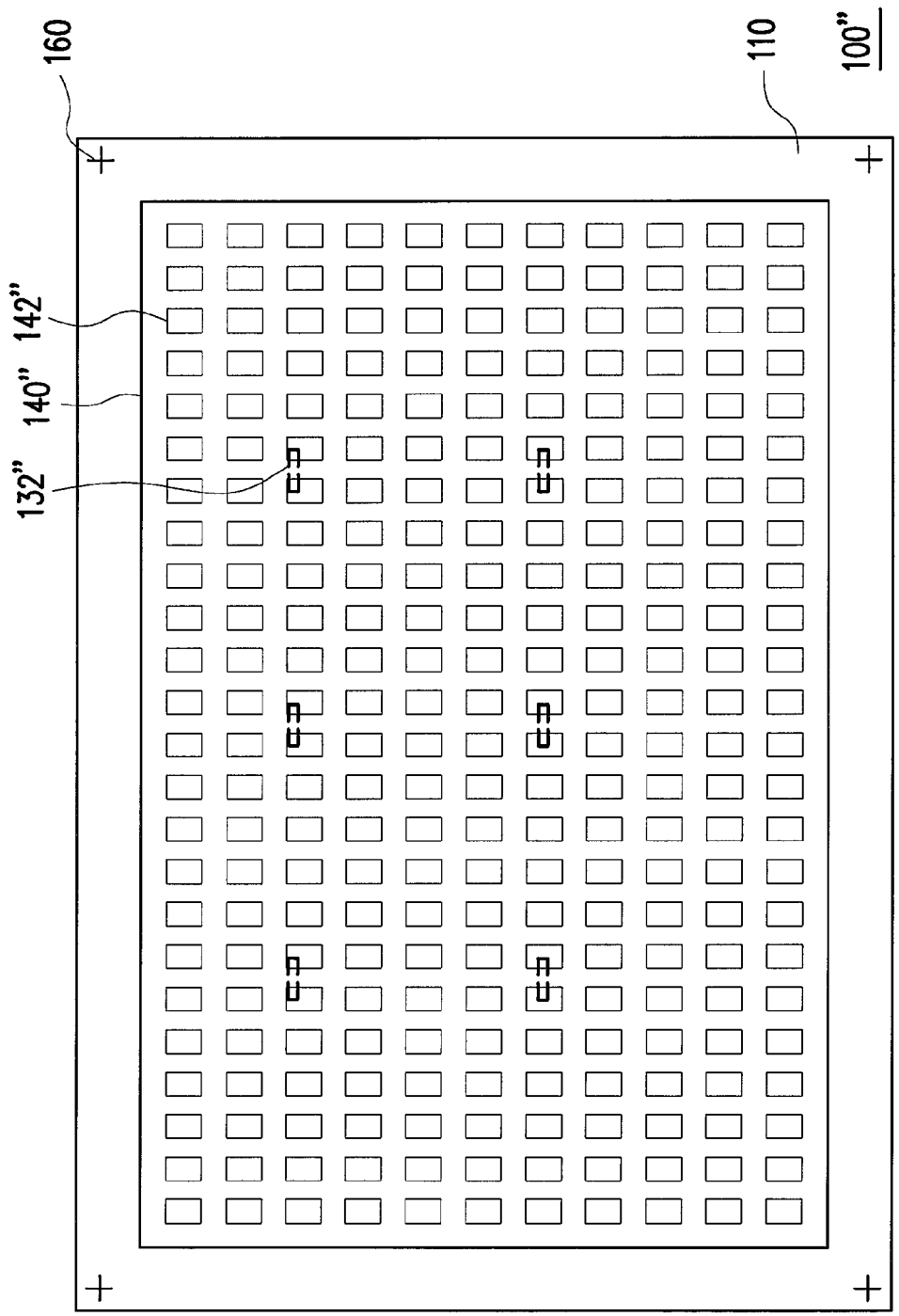
Figure 5C:
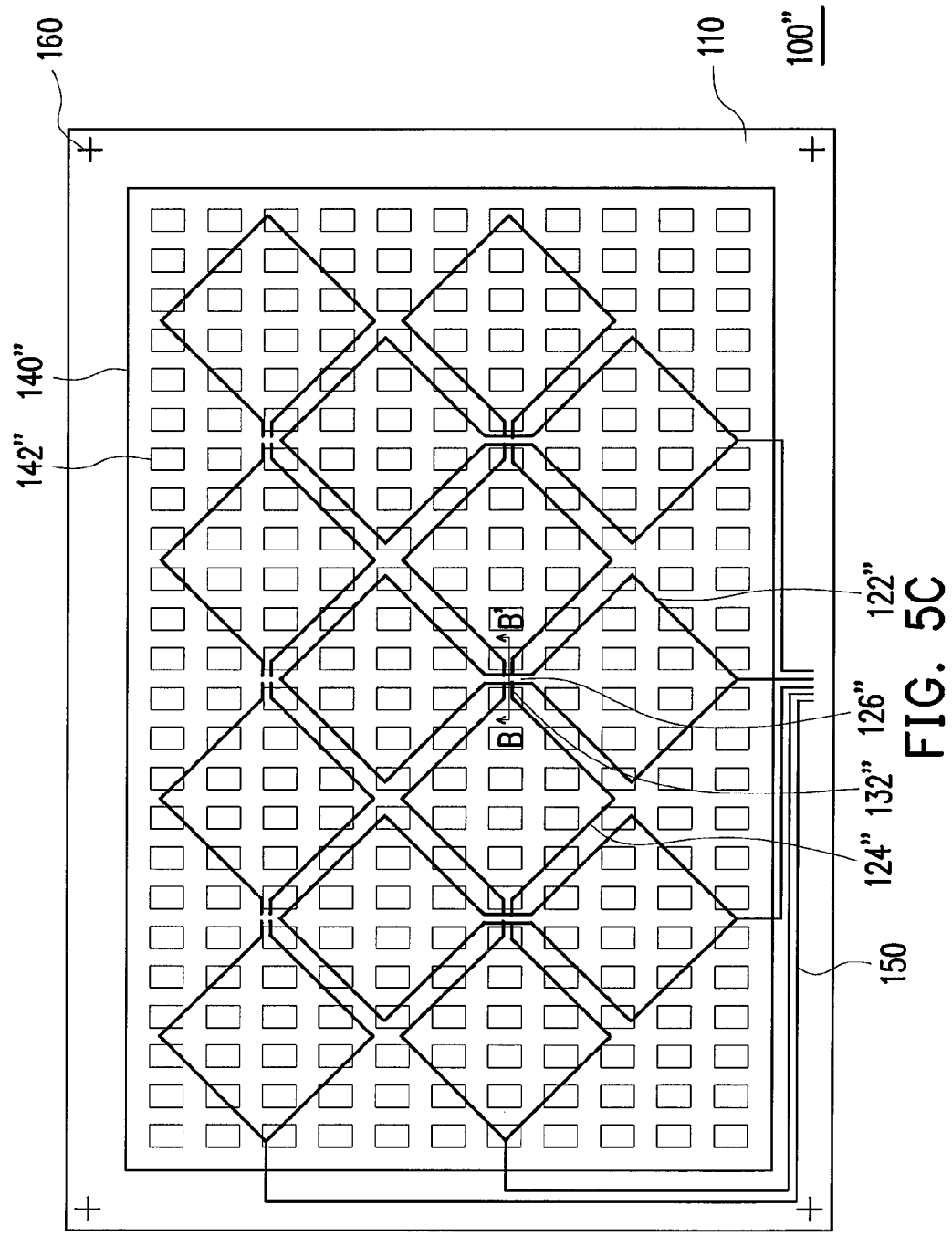
Figure 6:
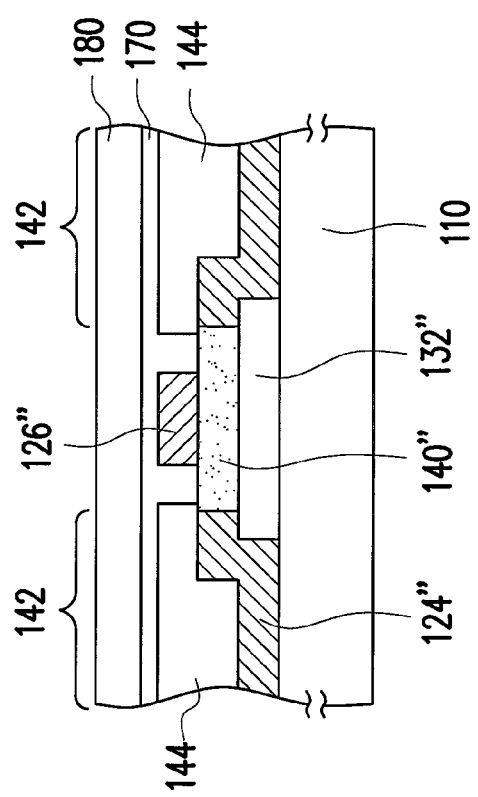
FIG. 6 is a schematic cross-sectional view of FIG. 5C along line B-B'.

FIGS. 5A to 5C are schematic flow diagrams showing steps in a manufacturing method of a color filter touch sensing substrate according to other embodiments of the present invention. FIG. 6 is a cross-sectional view of FIG. 5C along line B-B'. Firstly, referring to FIG. 5A, a plurality of second bridge lines 132" is formed on the substrate 110. In the present embodiment, a material of the second bridge lines 132" may be metal or a transparent conductive material. Moreover, the alignment pattern 160 may be formed while forming the second bridge lines 132". For convenience in the manufacturing process, the material used for the alignment pattern 160 may be the same as that used for the second bridge lines 132".

Referring to FIG. 5B, then, a light shielding pattern layer 140" is formed on the second bridge lines 132". In addition, the light shielding pattern layer 140" exposes both ends of the second bridge lines 132". In the present embodiment, a material of the light shielding pattern layer 140" may be black resin or other insulating materials. The light shielding pattern layer 140" is disposed above the second bridge lines 132", and uses an insulating material, which prevents the second bridge lines 132" to electrically contact with a film or circuit subsequently formed above the light shielding pattern layer 140".

Furthermore, refer to FIG. 5C and a partial cross-sectional view of FIG. 5C (FIG. 6) simultaneously, a plurality of first touch sensors 122", a plurality of second touch sensors 124", and a plurality of first bridge lines 126" are formed on the light shielding pattern layer 140". The first bridge lines 126" cross over the second bridge lines 132" so that the first touch sensors 122" in the same column are electrically connected. The second touch sensors 124" contact with the exposed second bridge lines 132", such that the second touch sensors 132" in the same row are electrically connected. Additionally, the periphery circuit 150 may be formed while forming the first touch sensors 122", the second touch sensors 124", and the first bridge lines 126". To reduce the manufacturing process, the material of the periphery circuit 150 may be selected from the material similar to that of the first touch sensors 122", the second touch sensors 124", and the first bridge lines 126", for example, metal or transparent conductive materials such as ITO, IZO, etc.

Upon completion of steps aforementioned, steps of forming color filter pattern layers, a covering layer, and an electrode layer may be proceeded. The steps are identical or similar to the corresponding steps in the manufacturing method of the color filter touch sensing substrate 100, thus are not repeated herein.

Referring to FIG. 5C and FIG. 6 simultaneously, a color filter touch sensing substrate 100" formed by the aforementioned manufacturing method includes the first touch sensors 122", the second touch sensors 124", the first bridge lines 126", the second bridge lines 132", the light shielding pattern layer 140", and the color filter pattern layers 144". As illustrated in FIG. 6, the second bridge lines 132" are disposed on a surface of the substrate 110. Also, the light shielding pattern layer 140" is disposed on the second bridge lines 132", and the light shielding pattern layer 140" exposes the both ends of the second bridge lines 132". Moreover, the first touch sensors 122", the second touch sensors 124", and the first bridge lines 126" are disposed on the light shielding pattern layer 140". It is clear from FIG. 6 that, the light shielding pattern layer 140" is disposed between the first bridge lines 126" and the second bridge lines 132". Additionally, the light shielding pattern layer 140" utilizes insulating materials such as black resin. Hence, the first bridge lines 126" and the second bridge lines 132" will not contact with each other to result in short circuit. The first bridge lines 126" cross over the second bridge lines 132" so as to electrically connect the first touch sensors 122" in the same column. Also, the second touch sensors 124" in the same row are electrically connected to each other through the exposed second bridge lines 132". As illustrated in FIG. 5C, the first touch sensors 122", the second touch sensors 124" will be electrically connected with the periphery circuit 150 such that touch signals sensed by the first touch sensors 122" and the second touch sensors 124" are exported through the periphery circuit 150.

Figure 7:
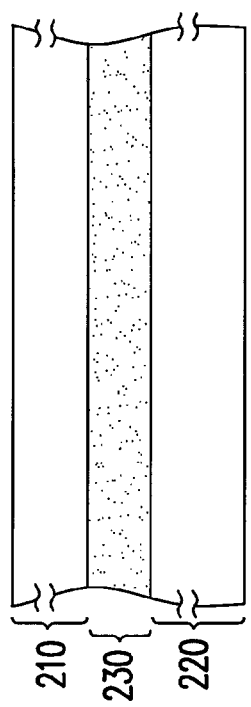
FIG. 7 is a schematic view of a display panel according to another embodiment of the present invention.

FIG. 7 is a schematic view of a display panel according to another embodiment of the present invention. Referring to FIG. 7, a display panel 200 in the present embodiment includes a color filter touch sensing substrate 210, an active device array substrate 220, and a liquid crystal layer 230.

The color filter touch sensing substrate 210 can utilize the color filter touch sensing substrate 100 in FIG. 1C, the color filter touch sensing substrate 100' in FIG. 4C, or the color filter touch sensing substrate 100" in FIG. 5C.

The active device array substrate 220 is disposed opposite to the color filter touch sensing substrate 210. Generally speaking, the active device array substrate includes devices such as active devices, scan lines, data lines, and pixel electrodes, etc.

The liquid crystal layer 230 is disposed between the active device array substrate 220 and the color filter touch sensing substrate 210. The liquid crystal layer 230 is mainly composed of a liquid crystal material and can alter different tilting or twisting angles of liquid crystal molecules through voltage regulation to generate a displaying effect.

The detail steps of the manufacturing method of the display panel 200 are illustrated in the following. Firstly, a manufacturing process of a color filter touch sensing substrate 210 is performed, the process may be manufactured with the method illustrated in FIG. 2A to FIG. 2D, the method illustrated in FIG. 3A to FIG. 3D, the method illustrated in FIG. 4A to FIG. 4C, or the method illustrated in FIG. 5A to FIG. 5C. Furthermore, a manufacturing process of the active device array substrate 220 is performed, where a manufacturing process of a known active device array substrate is used. Afterward, the active device array substrate 220 is assembled with the color filter touch sensing substrate 210, and a liquid display panel can be formed by forming a liquid crystal layer 230 between the active device array substrate 220 and the color filter touch sensing substrate 210. The method of forming the liquid crystal layer 230 between the active device array substrate 220 and the color filter touch sensing substrate 210 includes using a known vacuum injection method or liquid crystal drop filling method.

In summary, the present invention uses the light shielding pattern layer as the insulation structure between the first and the second bridge lines, and does not use the Chromium black matrix as the touch sensor, thus will not have the problem of weak touch signals. In addition, since the light shielding pattern layer is used directly to separate the first bridge lines and the second bridge lines, no additional formation of an insulation layer is required to separate the bridge lines, such that the manufacturing steps are reduced and manufacturing time is saved. In addition, as the color filter touch sensing substrate and the display panel provided in the present invention have the built-in touch sensor on an inner side of the color filter substrate, the present invention may be applied to the display products for slimness.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A manufacturing method of a color filter touch sensing substrate, comprising:
    forming a first film on a substrate, wherein the first film comprises a plurality of first touch sensors, a plurality of second touch sensors, and a plurality of first bridge lines electrically connecting the plurality of first touch sensors in the same column;
    forming a second film on the substrate, wherein the second film comprises a plurality of second bridge lines electrically connecting the plurality of second touch sensors in the same row;
    forming a light shielding pattern layer between the first film and the second film so as to define a plurality of sub-pixel regions on the substrate, wherein a portion of the light shielding pattern layer is disposed at junctions between the plurality of second bridge lines and the plurality of first bridge lines, and the first bridge lines are electrically isolated from the second bridge lines by the portion the light shielding pattern layer; and
    forming a plurality of color filter pattern layers in the plurality of sub-pixel regions.

2. The manufacturing method as claimed in claim 1, wherein the method of forming the first film, the second film, and the light shielding pattern layer comprises:
    forming the plurality of first touch sensors, the plurality of second touch sensors, and the plurality of first bridge lines electrically connecting the first touch sensors in the same column on the substrate;
    forming the light shielding pattern layer, wherein a portion of the light shielding pattern layer covers the plurality of first bridge lines; and
    forming the plurality of second bridge lines, wherein the plurality of second bridge lines cross over the light shielding pattern layer covering the plurality of first bridge lines so as to electrically connect the plurality of second touch sensors in the same row.

3. The manufacturing method as claimed in claim 1, further comprising forming a plurality of periphery circuits electrically connected to the plurality of first touch sensors and the plurality of second touch sensors on the substrate.

4. The manufacturing method as claimed in claim 1, further comprising forming at least an alignment pattern in the periphery of the substrate.

5. The manufacturing method as claimed in claim 1, wherein each of the plurality of second bridge lines crosses over the light shielding pattern layer between two adjacent sub-pixel regions, such that the plurality of second touch sensors in the same row are electrically connected.

6. The manufacturing method as claimed in claim 1, wherein a width of each of the first bridge lines is smaller than a distance between two sub-pixel regions, and each of the plurality of second bridge lines crosses over at least two sub-pixel regions so as to electrically connect the plurality of second touch sensors in the same row.

7. The manufacturing method as claimed in claim 1, further comprising:
    forming a covering layer on the plurality of color filter pattern layers; and
    forming an electrode layer on the covering layer.

8. The manufacturing method as claimed in claim 1, wherein a material of the plurality of second bridge lines is a metal or a transparent conductive material.

9. The manufacturing method as claimed in claim 1, wherein a material of the light shielding pattern layer comprises black resins.

10. A color filter touch sensing substrate, comprising:
    a first film, disposed on a substrate, wherein the first film comprises a plurality of first touch sensors, a plurality of second touch sensors, and a plurality of first bridge lines electrically connecting the plurality of first touch sensors in the same column;
    a second film, disposed on the substrate, wherein the second film comprises a plurality of second bridge lines electrically connecting the plurality of second touch sensors in the same row;
    a light shielding pattern layer, disposed between the first film and the second film to define a plurality of sub-pixel regions on the substrate, wherein a portion of the light shielding pattern layer is disposed at junctions between the plurality of second bridge lines and the plurality of first bridge lines, and the first bridge lines are electrically isolated from the second bridge lines by the portion the light shielding pattern layer; and
    a plurality of color filter pattern layers, disposed within the plurality of sub-pixel regions.

11. The substrate as claimed in claim 10, wherein
    the plurality of first touch sensors, the plurality of second touch sensors, and the plurality of first bridge lines are disposed on a surface of the substrate;
    the light shielding pattern layer is disposed on the plurality of first touch sensors and the plurality of second touch sensors, wherein a portion of the light shielding pattern layer covers the plurality of first bridge lines; and the plurality of second bridge lines cross over the light shielding pattern layer covering the plurality of first bridge lines so as to electrically connect the plurality of second touch sensors in the same row.

12. The substrate as claimed in claim 10, further comprising
at least an alignment pattern, disposed in the periphery of the substrate; and
a plurality of periphery circuits, electrically connected to the plurality of first touch sensors and the plurality of second touch sensors.

13. The substrate as claimed in claim 10, wherein each of the plurality of second bridge lines crosses over the light shielding pattern layer between two adjacent sub-pixel regions, so as to electrically connect the plurality of second touch sensors in the same row.

14. The substrate as claimed in claim 10, wherein a width of the light shielding pattern layer is smaller than a width of the plurality of first bridge lines, and each of the plurality of second bridge lines crosses over at least two sub-pixel regions so as to electrically connect the plurality of second touch sensors in the same row.

15. The substrate as claimed in claim 10, further comprising
a covering layer, disposed on the plurality of color filter pattern layers; and
an electrode layer, disposed on the covering layer.

16. The substrate as claimed in claim 10, wherein a material of the plurality of second bridge lines is a metal or a transparent conductive material.

17. The substrate as claimed in claim 10, wherein a material of the light shielding pattern layer comprises black resins.

18. A manufacturing method of a display panel, comprising:
forming a first film on a substrate, wherein the first film comprises a plurality of first touch sensors, a plurality of second touch sensors, and a plurality of first bridge lines electrically connecting the plurality of first touch sensors in the same column;
forming a second film on the substrate, wherein the second film comprises a plurality of second bridge lines electrically connecting the plurality of second touch sensors in the same row;
forming a light shielding pattern layer between the first film and the second film so as to define a plurality of sub-pixel regions on the substrate, wherein a portion the light shielding pattern layer is disposed at junctions between the plurality of second bridge lines and the plurality of first bridge lines, and
the first bridge lines are electrically isolated from the second bridge lines by the portion the light shielding pattern layer;
forming a plurality of color filter pattern layers to form a color filter touch sensing substrate;
providing an active device array substrate; and
assembling the active device array substrate and the color filter touch sensing substrate and filling a liquid crystal layer between the active device array substrate and the color filter touch sensing substrate.

19. A display panel, comprising:
a color filter touch sensing substrate, comprising:
a first film, disposed on a substrate, wherein the first film comprises a plurality of first touch sensors, a plurality of second touch sensors, and a plurality of first bridge lines electrically connecting the plurality of first touch sensors in the same column;
a second film, disposed on the substrate, wherein the second film comprises a plurality of second bridge lines so as to electrically connect the plurality of second touch sensors in the same row; and
a light shielding pattern layer, disposed between the first film and the second film to define a plurality of sub-pixel regions on the substrate, wherein a portion the light shielding pattern layer is disposed at junctions between the plurality of second bridge lines and the plurality of first bridge lines, and the first bridge lines are electrically isolated from the second bridge lines by the portion the light shielding pattern layer; and
a plurality of color filter pattern layers, disposed within the plurality of sub-pixel regions.an active device array substrate, disposed opposite to the color filter substrate; and
a liquid crystal layer, disposed between the active device array substrate and the color filter touch sensing substrate.

* * * * *